US009092275B2

(12) United States Patent
Heidelberger et al.

(10) Patent No.: US 9,092,275 B2
(45) Date of Patent: Jul. 28, 2015

(54) STORE OPERATION WITH CONDITIONAL PUSH OF A TAG VALUE TO A QUEUE

(71) Applicant: International Business Machines Corporation, Armonk, NY (US)

(72) Inventors: Philip Heidelberger, Cortlandt Manor, NY (US); Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/682,121

(22) Filed: Nov. 20, 2012

(65) Prior Publication Data

US 2014/0143519 A1 May 22, 2014

(51) Int. Cl.
*G06F 9/54* (2006.01)
*G06F 12/10* (2006.01)
*G06F 12/14* (2006.01)

(52) U.S. Cl.
CPC .............. *G06F 9/54* (2013.01); *G06F 12/1027* (2013.01); *G06F 12/145* (2013.01); *G06F 2212/681* (2013.01)

(58) Field of Classification Search
CPC .............. G06F 12/145; G06F 12/1027; G06F 2212/681
See application file for complete search history.

(56) References Cited

U.S. PATENT DOCUMENTS 5,850,543 A * 12/1998 Shiell et al. .................... 712/238

* cited by examiner

*Primary Examiner* — Mardochee Chery
(74) *Attorney, Agent, or Firm* — Cantor Colburn LLP

(57) ABSTRACT

According to one embodiment, a method for a store operation with a conditional push of a tag value to a queue is provided. The method includes configuring a queue that is accessible by an application, setting a value at an address in a memory device including a memory and a controller, receiving a request for an operation using the value at the address and performing the operation. The method also includes the controller writing a result of the operation to the address, thus changing the value at the address, the controller determining if the result of the operation meets a condition and the controller pushing a tag value to the queue based on the condition being met, where the tag value in the queue indicates to the application that the condition is met.

20 Claims, 2 Drawing Sheets

US 9,092,275 B2

STORE OPERATION WITH CONDITIONAL PUSH OF A TAG VALUE TO A QUEUE

This invention was made with Government support under contract B554331 awarded by United States Department of Energy. The Government has certain rights to this invention.

BACKGROUND

The present invention relates generally to computer systems, and more particularly to data structures used in a memory of a computer system.

Computer systems have continually evolving technology leading to increased performance and complexity in the systems. For example, systems with multiple processors and/or processors with multiple cores will lead to simultaneous execution of a plurality of threads. Data structures, such as a queues, stacks and double ended queues ("deques"), may be used to implement an application.

In some cases, such as a networked computer system delivering packets out of order, counters may be used in each destination node. The counter value is initialized to the number of packets, where the counter value may indicate all of the packets are received when it reaches a selected value. The application periodically polls the counter to determine the value and thus is notified that all of the packets are received when it reads the selected value when polling the counter.

SUMMARY

According to one embodiment, a method for a store operation with a conditional push of a tag value to a queue is provided. The method includes configuring a queue that is accessible by an application, setting a value at an address in a memory device including a memory and a controller, receiving a request for an operation using the value at the address and performing the operation. The method also includes the controller writing a result of the operation to the address, thus changing the value at the address, the controller determining if the result of the operation meets a condition and the controller pushing a tag value to the queue based on the condition being met, where the tag value in the queue indicates to the application that the condition is met.

According to another embodiment, a method for conditionally pushing a value to a queue in a memory system including a memory and a controller includes setting a value at an address in the memory system, the queue being accessible by an application. The method also includes the controller receiving a request for an operation using the value at the address and performing the operation. The method also includes the controller storing a result of the operation to the address, determining if a condition is met based on the result and pushing a selected value to the queue based on the condition being met, where the selected value in the queue indicates to the application that the condition is met.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to operating a memory system that includes a memory and a memory controller (also referred to herein as a "controller"). The memory may include any suitable memory device and in one embodiment includes one or more memory devices (e.g., random access memory "RAM" chips and/or cache) connected to the memory controller, and the memory controller is configured to control the memory. In an embodiment, the memory system is configured to implement a queue accessible by one or more applications. The queue uses memory to store various values for use by one or more applications. In one embodiment, counters are also established in the memory, where each counter, upon reaching a selected value, is configured to identify a selected condition to an application. For example, in an embodiment with a networked computer system where packets may arrive out of order, a counter may be used in a destination node (e.g., memory system and processor or processing element receiving packets) to count the packets received from a sending node. The user or application initializes the counter value to the number of packets that are sent. The counter value then indicates that all of the packets have been received when it decrements to a selected value, such as zero. In an embodiment, when the counter value meets a selected condition, such as a store operation decrementing the counter to zero, the controller causes a conditional action to occur, such as pushing the address of the counter to a queue established in memory. Accordingly, applications can simply access the queue to determine the status of one or more counters in the memory, as compared to systems that implement polling of each counter in memory by each application. Thus, embodiments implementing a store operation changing a value at an address, such as a counter, with a conditional action of pushing to a queue, simplify and improve efficiency for applications using such values.

Figure 1:
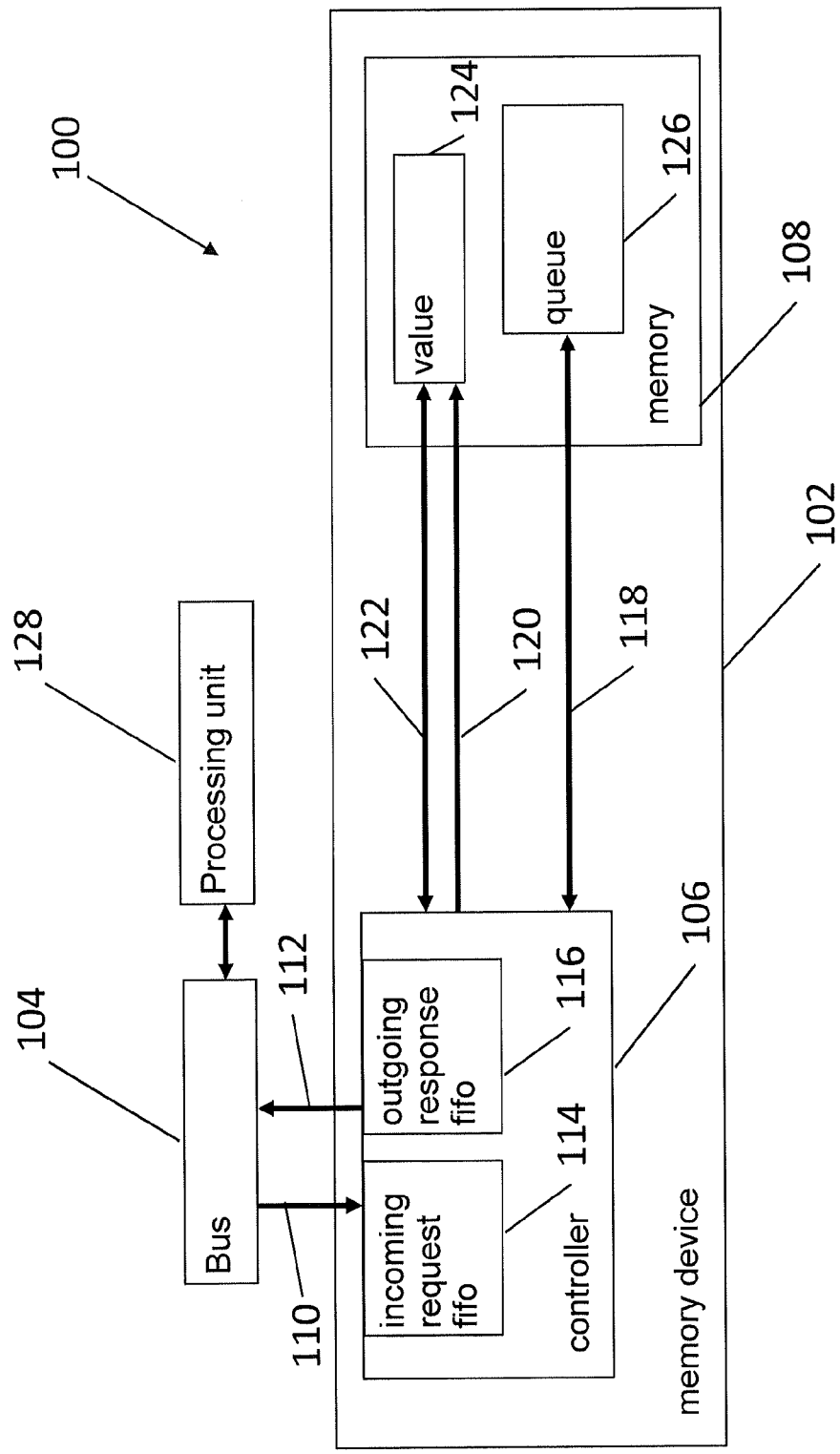
FIG. 1 illustrates a block diagram of a memory system implementing a store operation with a conditional push in accordance with an embodiment.

FIG. 1 illustrates a block diagram of a memory system 100 in accordance with an embodiment. The depicted memory system 100 includes a memory device 102 coupled to a bus 104, where the bus 104 is coupled to one or more processing units 128 that may issue requests to the memory device 102. Processing units 128 include, but are not limited to processors, network interface units or other DMA devices, and/or higher-level caches. In an embodiment, the memory device 102 includes a controller 106 and a memory 108. The controller 106 includes a receiver 114 and a transmitter 116 configured to communicate with the bus 104, where the receiver 114 and transmitter 116 each include first-in-first-out buffers (FIFOs). The controller 106 (also referred to herein as "a memory controller") controls usage of the memory 108. The memory 108 is any suitable physical memory. In an embodiment, a value 124 at an address and a queue 126 are configured within memory 108, where the value 124 is used by an application or user to determine a state of the application. In an embodiment, the queue 126 may be updated, such as by pushing (inserting) or popping (removing) values to or from the queue, by the controller 106. Values stored in the queue are used by one or more applications to determine their state.

In one embodiment, a request 110 from a requestor or user, such as a thread, is received from the bus 104 by the receiver 114. The requestor may be a thread executing an application. The request 110 may be any suitable request for changing the value 124 and conditionally performing an action based on the change of value 124. In an embodiment, a request that is a memory store operation specifies an operand and an address for storing the operand. Embodiments where the request 110 is a memory store operation which specifies the address for the value 124 and specifies anywhere between zero and a plurality of operands are described below. In an embodiment, a conditional action that occurs when a value meets a selected condition is a push action to a queue. The push action inserts a tag value to a top or bottom of a queue if based on the selected condition being met, such as the value 124 meeting a condition. In embodiments, the tag value in the push action is the value pushed to the queue. In an embodiment, request 110 is performed by actions 122 and 120 where the value 124 is read by the controller 106 in action 122 and the value 124 is also changed. In action 120 the controller 106 writes the result of performing a suitable operation on the value 124, such as a mathematical operation (e.g., decrementing, incrementing, adding, subtracting, or bitwise ANDing), specified by the request 110. The operation may be performed using an operand value specified in request 110. In an embodiment, the request 110 includes a first operand identifying the operation and a second operand value for the operation on the value 124. In an embodiment, the value 124 may be representing by a 1 byte, 2 byte, 4 byte or 8 byte quantity, with a corresponding representation size for the operand value. Following the writing operation in action 120, the controller 106 determines if the changed value 124 meets a condition, such as being equal to zero, to determine whether to perform the conditional action specified by request 110. In an embodiment, action 118 includes a push of a value to the queue 126 based on the changed value 124 meeting the condition. If the changed value does not meet the condition, the push action in 118 is not performed.

In one embodiment, the queue 126 is an alternative data structure such as a stack or a double-ended queue or a tree or a hash table. The push action 118 of a value to the queue 126 corresponds to inserting the value to the selected data structure. In one embodiment, the queue 126 corresponds to a memory location. The push action 118 of a value to the queue 126 corresponds to writing the value to the memory location, thus overwriting the value of any earlier write to the location. In an embodiment where the data structure is a queue, the queue may be a queue accessed via atomic memory operations.

In one embodiment, the queue 126 may be physically located in a different memory device than the memory device 102 containing the value 124. In an embodiment, the queue 126 may be in a processing unit 128 such as a network device or other device. In one embodiment, the controller 106 in memory device 102 uses the bus 104 to push 118 to such a queue in another device. In an embodiment, the address of the queue 126 can identify a queue in a device different from the memory device 102 containing the value 124 and its controller 106.

In embodiments, the request 110 corresponds to a single store instruction and as such is an atomic memory operation received and performed by the controller 106. Thus, the controller provides an atomic interface, further providing improved usability with low hardware and software overhead. Lower overhead is provided in embodiments with a multi-threaded application, where multiple threads concurrently issue requests, such as request 110. In one embodiment, multiple requests by one or more threads or other devices may be to the same value 124. In another embodiment, multiple requests may be to different values using the same queue 126, when a request meets a selected condition. In yet another embodiment, multiple requests may be to different values and different queues.

In one embodiment, the action 120 is a decrement of a counter established in the value 124 (i.e., a counter value). In an embodiment, once the counter value 124 reaches a specified value or condition, such as zero, a tag value is pushed to the queue 126. In one embodiment, the tag value is the address of the value 124 itself, where the address is the tag value pushed 118 to the queue 126. In another embodiment, the tag value is stored in memory at a fixed offset address relative and proximate to the value 124. In another embodiment, an application or user provides the tag value as an operand in the request 110. The tag value may be shared by several counters, thus identifying to applications accessing the queue that one of the counters has completed its task. In another embodiment, the tag value provides instruction to the application as to a subsequent action to take. In another embodiment, the conditional push pushes a tag value that is the value 124 before the operation that meets the condition is performed. In another embodiment, the operation is performed, and the resulting value is used to determine the value to conditionally push, but the result is not written to the value 124. In yet another embodiment, the operation is a null operation leaving the value 124 unchanged, so that the conditional push is based on the existing and unchanged value 124. In another embodiment, the operation is a floating point add operation and the conditional push is based on a condition of whether the result has reached the value 0 or has a different sign than the original value 124.

In one embodiment, the address of queue 126 is stored at a fixed offset location in relation to the address of value 124. The controller 106 writes the queue address to the fixed offset location when configuring the queue 126 before requests are received. In another embodiment, the user provides the queue address as an operand in the request 110. In one embodiment, a single address for the queue is defined at the start of the memory page or at a fixed offset in the memory page, thus serving all counters or values being operated on within the page.

In embodiments, where the request 110 specifies an add operation, the specified value to be added to value 124 is provided as an operand value in the request 110. In such an operation, if the result of the operation equals a selected value, the condition is met and a tag value is pushed to the queue 126. In another embodiment, the operation is a bitwise AND operation where a specified value to be ANDed with the value 124 is provided as an operand value in the bitwise AND request 110.

In an embodiment, a page size and alignment for any request 110 is defined in a kernel-protected field in the controller 106 that cannot be modified by users. In embodiments, for a request 110 that is received, the controller 106 first ensures that the value 124 and queue 126 are on the same page in memory. In an embodiment, the request 110 corresponds to a store to the value 124 address. Thus, a request 110 reaching the controller 106 implies that the operating system (OS) has configured the processor memory address translation hardware in the memory device 102 to allow a user to access that page in memory. The page size therefore prevents a user from inadvertently or maliciously specifying a queue address such that a request 110 would cause access to another user's memory. This is the case for a queue address specified as an operand in request 110 or alternatively a queue address stored at a fixed offset location in relation to the address of the value 124. When the controller 106 prevents a request 110 with an off-page access, the controller 106 could raise an error condition such as raising an interrupt. In an embodiment, the controller 106 has a configurable table where each row contains a page size and is indexed by OS-configurable user-defined bits in the translation hardware, where the user-defined bits accompany the real address of a request 110 to the memory controller 106. In an embodiment, the kernel-protected field specifying the page size and alignment is a kernel-protected operand in the request 110 and the operand is provided by the processor memory address translation hardware. For embodiments with page sizes which are power of 2, as are typically used in processor memory address translation hardware, an operand using 5 bits can indicate page sizes up to 2 to the power of (2 to the power of 5), i.e., $2^{32}$=4 gigabytes.

In another embodiment for the received request 110, the memory controller 106 ensures the queue 126 is the correct queue location to receive the conditional push of the tag value by comparing a first key value associated with the value 124 to a second key value associated with the queue 126. The first key is located at a fixed offset address relative to the value 124 and the second key is located at a fixed offset address relative to the queue 126.

An embodiment is directed to a queue 126 supporting tokens, the tokens allowing a user to reserve space for subsequent pushes to the queue and thus avoid attempts to push to a full queue. Typically, the queue includes a token parameter representing the number of free and unreserved spaces available for future pushes to the queue. In an embodiment, when serving a pop request, the queue increments its token parameter. When serving a push request, the queue does not change the token parameter. A user can request token(s) from the queue and thus obtain one or more tokens and thus reserve space for future pushes. On serving such a request, the queue decrements its token parameter, unless the token parameter reaches 0, in which case the user does not obtain a token. A corresponding request allows a user to return one or more unused tokens to the queue. On serving this request, the queue increments its token parameter. In the embodiment, the user is expected to obtain a token before issuing a request 110 with a conditional push. In an embodiment, the request 110 includes an operand identifying the use of tokens by the queue. In embodiments, for the request 110, if the condition results in the controller 106 pushing a tag value to the queue 126, then the push implicitly returns a token to the queue 126. In an embodiment, if the condition does not result in the controller 106 pushing a tag value to the queue 126, then the controller 106 explicitly issues a request to return a token to the queue 126. Thus, the request 110 cannot result in the controller 106 attempting to push to a full queue 126.

In another embodiment, the request 110 is a store-and-load operation with a conditional push to a queue, where the load reply value 112 indicates if a push failed due to a full queue. In an embodiment, the request 110 is a load operation requesting an operation on the value 124, where the operation's result is used to determine a conditional push to a queue, where the load reply value 112 is the result of the operation.

In embodiments of the memory system 100, configuration information is stored in a memory location at a fixed offset address relative to the address of the value 124. The configuration information may include a tag value, queue address, key information, mathematical operations to be performed, operand values, push conditions and information indicating whether tokens are used.

An embodiment is directed to an application for a breadth-first traversal of a graph, where a bit vector with 1 bit for each node is used to record the nodes already visited. The graph consists of nodes and arcs where an arc connects two nodes. The traversal of a graph moves from one node along an arc to another node. In the traversal, a newly-set bit in the bit vector corresponds to a newly visited node which needs further processing. In an embodiment, identifying the newly-set bit and enqueing the node for further processing using an application in software can be a performance bottleneck. In an embodiment, a request 110 includes an operand value which is bit-wise OR-ed into the value 124 at an address also provided in the request 110. In such a bit-wise OR operation, a bit which had value 0 in value 124 can be newly set to the value 1. Accordingly, for each bit which is newly set in the value 124, a push action occurs onto the queue 126 for the tag value, wherein the tag value has a first field identifying the address of the value and has a second field identifying the newly-set bit. In one embodiment, for a 64-bit value 124 and a 64-bit operand value in the request 110, a 64-bit tag value consists of a first field that is 59-bits in length, identifying the address of the value 124, and second field 5-bits in length, identifying the newly-set bit. A 5-bit field can identify one of 64 bits ($2^5$ bits). An application popping an element from the queue 126 can thus identify address of the value 124 from the first field and the newly-set bit from the second field and can thus identify the newly visited node which needs further processing.

Figure 2:
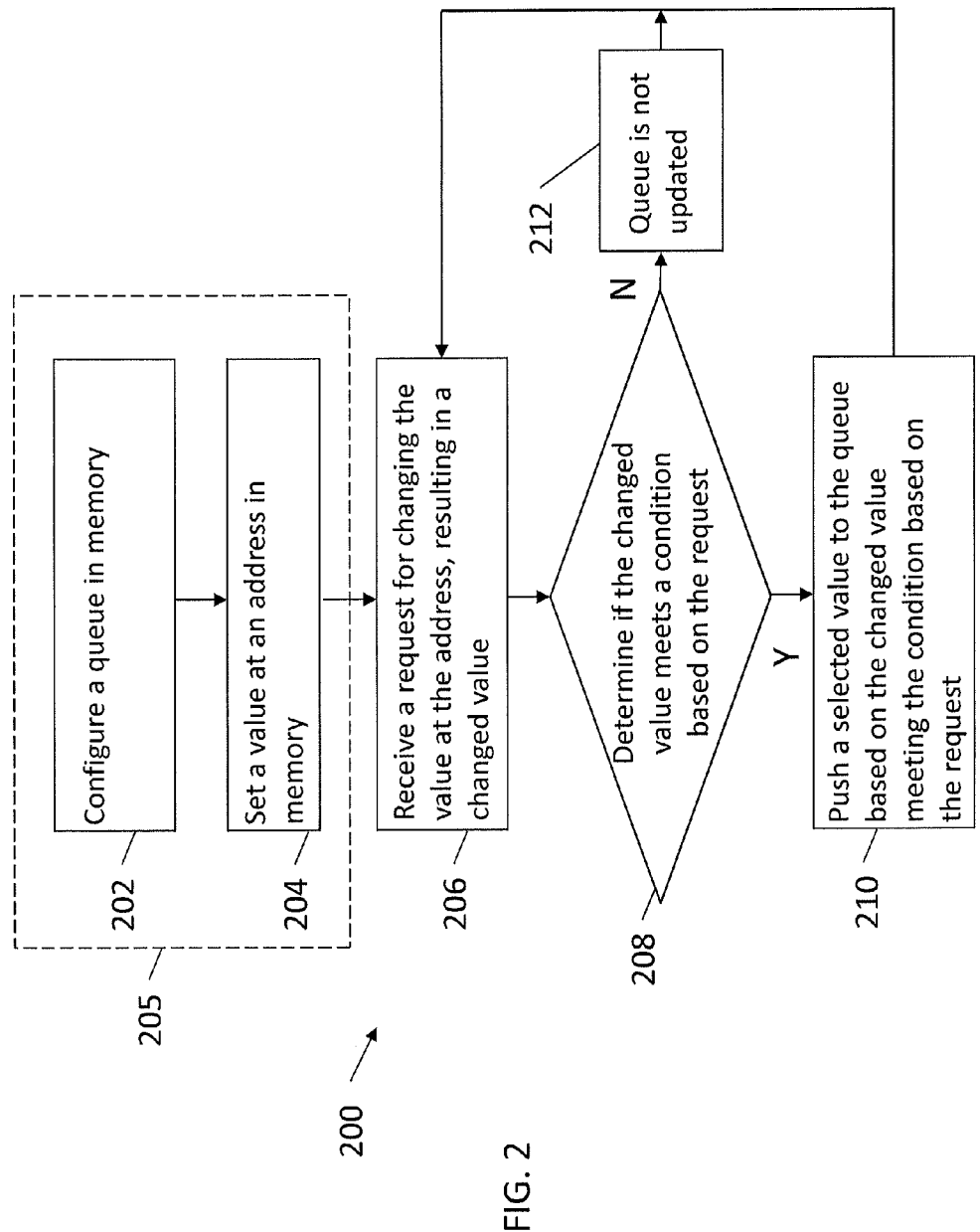
FIG. 2 illustrates a flow diagram of a memory system implementing a store operation with a conditional push in accordance with an embodiment.

FIG. 2 is a flow chart of an exemplary method and system for operating a memory system, such as the memory systems shown in FIG. 1. In embodiments, the steps may be performed by a controller, such as a memory controller, higher level cache and/or processor(s). In block 202, a queue 126, is configured in memory. In embodiments, the configuration includes defining queue parameters in metadata (information describing the queue) stored in the memory alongside the queue. In an embodiment, the parameters include an array start location, an array size, a queue top and a queue bottom. In embodiments, the configuration block 202 is performed once to initially configure the queue 126. In block 204, a value 124 is set at an address in the memory by the memory controller. For example, the value may be a counter value that is used to indicate completion of an application action when it reaches zero or another selected value. In embodiments, a counter value is set or configured for a plurality of counters in the system in block 204, where this step is performed once during initial configuration. Accordingly, the initial configuration block 205, including blocks 202 and 204, may be performed once during initial configuration, while blocks 206 to 212 may be repeated for each request 110 received. In one embodiment, an application can later configure counters, without reconfiguring the queue.

In block 206, a request 110 from a user or requestor is received, where the request includes performing a store operation in memory that changes the value 124 at the address set in block 204, thus producing a changed value. In block 208, the memory controller determines if the resulting changed value meets a condition specified by the request. In embodiments, the condition is to determine if the changed value is equal to a selected value. In one embodiment the changed value is an incremented or decremented counter, where the controller determines if the counter value is equal to a selected value, such as zero. In block 210, if the changed value meets the condition, a value is pushed to a queue 126, thus indicating that the selected condition has occurred for the value when later an application accesses the queue. In one embodiment, the value pushed to the queue is the address of the value 124. In block 212, if the changed value does not meet the condition, the queue is not updated. As shown, in the diagram, following block 210 or 212, the controller then waits for the next request 110 and returns to block 206.

In one embodiment, the queue is configured a single time. In embodiments, the queue serves many values that are operated upon by requestors or users, where the values may be counters. In addition, a counter may be configured and may then have many requests against the counter. Further, the counter may be reused by software in some embodiments.

An exemplary embodiment of the method and system includes a destination node receiving out-of-order incoming packets from other nodes on a network. For each incoming packet, the controller performs a "store decrement on zero push" request. If the decrement of the value, defined as a counter representing the total number of packets, reaches zero, then the counter value's address is pushed to the queue. Thus, the queue can be single queue used to indicate completed messages for a plurality of packet deliveries.

An embodiment is directed to an application consisting of a set of tasks to be executed. After a task has finished execution, it is deleted from the set of tasks. The application execution ends when the set of tasks is empty and there are no more tasks to be executed. A task can have multiple outputs and multiple inputs. An output of a first task can be an input to one or more tasks. Thus, the latter task cannot begin execution until the first task has finished execution. Accordingly, the latter task has a dependency on the first task. Each task to be executed includes a so-called 'dependence count' parameter which is initialized to the number of tasks it depends on. In the initialization, a task that depends on no tasks is pushed to a so-called 'ready queue' of tasks that are ready to begin execution. When a task finishes execution, for each of its dependent tasks the dependence count is decremented. When the dependence count reaches zero for a task (e.g., latter task), the task is ready to begin execution and is pushed onto the ready queue. A processor pops a task from the queue, executes the task, then pops another task for execution. Multiple processors can execute in parallel by individually popping and executing different ready tasks. In the embodiment, each task to be executed is described by a data structure which includes a value 124. The data structure also includes a value or descriptor for the function to be executed by the task as well as pointers to the input and output items of the task. For each task to be executed, the value 124 is initialized to the number of tasks this task depends on. In an initialization step, a task that depends on no tasks is pushed to the ready queue 126. When a task finishes execution, for each of its dependent tasks, a request 110 is issued to decrement the dependence counter of that task and to push the counter address to the queue 126 when the dependence counter reaches 0. A processor pops the address of a dependence counter from the queue 126 and can use the address to determine the address of the data structure describing the task to be executed. The processor then executes the task. Multiple processors can execute in parallel by individually popping and executing different ready tasks from the ready queue 126.

The memory system 100 may be a level in a cache hierarchy, so that the controller 106 serving a request 110 may result in memory system 100 access to lower level(s) in the cache hierarchy to establish the value 124 and queue 126 in cache 108. A memory system may be split into two or more parts, where a controller in a part may serve a value 124 and queue 126 using memory 108 in that part. In another embodiment, a cache level may be replicated as two or more units, where the controller may access any part of the underlying cache or memory levels within a cache unit.

An embodiment of the memory system includes one or more active buffered memory device. The active buffered devices may include a plurality of memory elements (e.g., chips) connected to a logic portion and a processing element. In an embodiment, the active buffered memory device includes layers of memory that form a three dimensional ("3D") memory device where individual columns of chips form vaults in communication with the processing element and logic. The memory device may include a plurality of processing elements configured to communicate to the chips and other processing elements in the memory system. In some embodiments, the active buffered memory device may comprise partitions that may be concurrently accessed by a plurality of processing elements, where the partitions may be any suitable memory segment, including but not limited to vaults. In an embodiment, a processing element accesses a selected address in a partition through an interconnect network Embodiments of the memory system include a memory stack with a processing element and memory controller in a hub chip (also referred to as logic chip or memory controller chip), referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor. In one example, a processing element may act as the requestor described above, thus utilizing the value 124 to perform an operation with the result determining the conditional push of a tag value to the queue 126.

In an embodiment, the active buffered memory device is configured to load configuration information or instructions from a part of the active buffered memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active buffered memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

Technical effects and benefits include a system that provides improved performance for components dynamically in a device depending upon sensed parameters and/or operation modes for the components.

According to an embodiment, a system and method for conditionally pushing a value to a queue in a memory system including a memory and a controller includes setting a value at an address in the memory system, the queue being accessible by an application. The method also includes the controller receiving a request for an operation using the value at the address and performing the operation. The method also includes the controller storing a result of the operation to the address, determining that a condition is met based on the result and pushing a selected value to the queue based on determining that the result meets the condition, where the selected value in the queue indicates to the application that the condition is met.

In an embodiment, an address of the queue is provided via one of: an operand in the request and an operand at a fixed offset with respect to the address of the value.

In an embodiment, the selected value is one of: the address of the value operated on, provided as an operand in the request and is provided at a fixed offset with respect to the address of the value.

In an embodiment, the request includes a first operand identifying the operation and a second operand value for the operation on the value at the address, and wherein the result of the operation using the second operand value and the value at the address is written to the address.

In an embodiment, the request corresponds to a single store instruction, the single store instruction being an atomic memory operation received and performed by the controller, wherein the single store instruction supports concurrent requests.

In an embodiment, receiving the request comprises receiving a decrement request that decrements the value at the address by one and determining if the result of the requested operation meets a condition comprises determining if the value is zero.

In an embodiment, the method comprises defining a kernel-protected field in the controller that specifies a size and an alignment of a memory page, wherein the controller serves the request only if the queue and the value at the address are located at a same page. In an embodiment, the kernel-protected field specifying the page size and alignment is a kernel-protected operand in the request, the kernel-protected operand being provided by processor memory address translation hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for a store operation with a conditional push of a tag value to a queue, the method comprising:
    configuring a queue that is accessible by an application;
    setting a value at an address in a memory device, the memory device including a memory and a controller;
    defining a protected field in the controller that specifies a size and an alignment of a memory page;
    receiving a request for an operation using the value at the address; and
    serving the request only if the queue and the value at the address are located at a same memory page, the serving comprising:
        performing the operation;
        writing a result of the operation to the address, thus changing the value at the address;
        determining, by the controller, whether the result of the operation meets a condition; and
        pushing, by the controller, the tag value to the queue based on the condition being met, wherein the tag value in the queue indicates to the application that the condition is met.

2. The method of claim 1, wherein the queue is in the memory device.

3. The method of claim 1, wherein an address of the queue is provided via one of: an operand in the request and at a fixed offset with respect to the address of the value.

4. The method of claim 1, wherein the tag value is one of: the address of the value operated on, provided as an operand in the request and provided at a fixed offset with respect to the address of the value.

5. The method of claim 1, wherein the request includes a first operand identifying the operation and a second operand value for the operation on the value at the address, and wherein the result of the operation using the second operand value and the value at the address is written to the address.

6. The method of claim 1, wherein the request corresponds to a single store instruction, the single store instruction being an atomic memory operation received and performed by the controller, wherein the single store instruction supports concurrent requests.

7. The method of claim 1, wherein receiving the request comprises receiving a decrement request that decrements the value at the address by one and wherein determining if the result of the requested operation meets a condition comprises determining if the value is zero.

8. The method of claim 1, wherein the protected field is a kernel-protected field.

9. The method of claim 8, wherein the kernel-protected field is a kernel-protected operand in the request, the kernel-protected operand being provided by processor memory address translation hardware.

10. The method of claim 1, wherein receiving the request comprises receiving a bitwise OR request that ORs an operand value provided in the request with the value at the address and writes the result to the address.

11. The method of claim 10, wherein as a result of the OR operation with the operand value for each newly-set bit in the value at the address, the tag value is pushed to the queue, wherein the tag value has a first field identifying the address of the value and has a second field identifying the newly-set bit, wherein the first field and the second field provide an application popping an element from the queue an ability to identify the address of the value and to identify the newly-set bit.

12. The method of claim 1, wherein:
    the queue supports tokens to reserve space for subsequent pushes to the queue;
    a user obtains a token before issuing a request for a store operation with a conditional push of a tag value to a queue, wherein the request includes an operand identifying to the controller a use of tokens by the queue; and returning, by the controller, a token to the queue based on the condition not being met.

13. A system for a store operation with a conditional push of a tag value to a queue, the system comprising:
a memory device including a memory and a controller, the system configured to perform a method comprising:
configuring a queue that is accessible by an application;
setting a value at an address in the memory device;
defining a protected field in the controller that specifies a size and an alignment of a memory page;
receiving a request for an operation using the value at the address; and
serving the request only if the queue and the value at the address are located at a same memory page, the serving comprising:
performing the operation;
writing a result of the operation to the address, the writing comprising changing the value at the address;
determining, by the controller, that the result of the operation meets a condition; and
pushing, by the controller, the tag value to the queue based on determining that the result of the operation meets the condition, wherein the tag value in the queue indicates to the application that the condition is met.

14. The system of claim 13, wherein the queue is in the memory device.

15. The system of claim 13, wherein an address of the queue is provided via one of: an operand in the request and an operand at a fixed offset with respect to the address of the value.

16. The system of claim 13, wherein the tag value is one of: the address of the value operated on provided as an operand in the request and provided at a fixed offset with respect to the address of the value.

17. The system of claim 13, wherein the request includes a first operand identifying the operation and a second operand value for the operation on the value at the address, and wherein the result of the operation using the second operand value and the value at the address is written to the address.

18. The system of claim 13, wherein the request corresponds to a single store instruction, the single store instruction being an atomic memory operation received and performed by the controller, wherein the single store instruction supports concurrent requests.

19. The system of claim 13, wherein receiving the request comprises receiving a decrement request that decrements the value at the address by one and wherein determining if the result of the requested operation meets a condition comprises determining if the value is zero.

20. The system of claim 13, wherein the protected field is a kernel-protected field.

\* \* \* \* \*